United States Patent
Laude et al.

(10) Patent No.: US 8,380,754 B2
(45) Date of Patent: Feb. 19, 2013

(54) APPARATUS AND METHODS FOR CREATING, UPDATING, AND USING LEARNING TOOLS

(76) Inventors: Michael Ernst Laude, San Diego, CA (US); Kristen Gilbert Glass, San Diego, CA (US)

( * ) Notice: Subject to any disclaimer, the term of this patent is extended or adjusted under 35 U.S.C. 154(b) by 785 days.

(21) Appl. No.: 12/559,140

(22) Filed: Sep. 14, 2009

(65) Prior Publication Data
US 2011/0066683 A1    Mar. 17, 2011

(51) Int. Cl.
*G06F 17/30*    (2006.01)

(52) U.S. Cl. .......................... 707/803; 707/705

(58) Field of Classification Search ........... 707/999.003, 707/705, 803, 999.102; 709/227
See application file for complete search history.

(56) References Cited

U.S. PATENT DOCUMENTS

| | | | |
|---|---|---|---|
| 5,122,952 A * | 6/1992 | Minkus | 705/7.38 |
| 6,438,353 B1 * | 8/2002 | Casey-Cholakis et al. | 434/350 |
| 6,507,351 B1 * | 1/2003 | Bixler | 715/810 |
| 6,519,445 B2 * | 2/2003 | Casey-Cholakis et al. | 434/350 |
| 6,647,383 B1 * | 11/2003 | August et al. | 1/1 |
| 6,755,657 B1 * | 6/2004 | Wasowicz | 434/167 |
| 7,051,276 B1 * | 5/2006 | Mogilevsky et al. | 715/209 |
| 7,273,374 B1 * | 9/2007 | Abbey | 434/157 |
| 8,195,809 B2 * | 6/2012 | Langan et al. | 709/227 |
| 8,257,228 B2 * | 9/2012 | Quatrochi et al. | 482/9 |
| 2002/0056003 A1 * | 5/2002 | Goswami | 709/227 |
| 2002/0064766 A1 * | 5/2002 | Cozens et al. | 434/350 |
| 2002/0119434 A1 * | 8/2002 | Beams et al. | 434/322 |
| 2002/0132215 A1 * | 9/2002 | Casey-Cholakis et al. | 434/350 |
| 2002/0143652 A1 * | 10/2002 | Beckett | 705/26 |
| 2002/0164565 A1 * | 11/2002 | Kanevsky et al. | 434/219 |
| 2002/0188583 A1 * | 12/2002 | Rukavina et al. | 706/45 |
| 2003/0046265 A1 * | 3/2003 | Orton et al. | 707/1 |
| 2003/0154176 A1 * | 8/2003 | Krebs et al. | 706/59 |
| 2003/0187964 A1 * | 10/2003 | Sage et al. | 709/221 |
| 2004/0043364 A1 * | 3/2004 | Wasowicz | 434/167 |
| 2004/0157193 A1 * | 8/2004 | Mejias et al. | 434/118 |
| 2004/0215756 A1 * | 10/2004 | VanAntwerp et al. | 709/223 |
| 2004/0234936 A1 * | 11/2004 | Ullman et al. | 434/322 |
| 2005/0080804 A1 * | 4/2005 | Bradshaw et al. | 707/102 |
| 2005/0196730 A1 * | 9/2005 | Kellman | 434/118 |
| 2005/0251494 A1 * | 11/2005 | Maria Jansen | 707/1 |

(Continued)

OTHER PUBLICATIONS

Augar et al., "Teaching and Learning Online with Wikis", In Proceedings of the 21st Australasian Society for Computer in Learning in Tertiary Education (ASCILITE) Conference, Perth: Dec. 5-8, 2004, 10 pages, accessed online at <http://www.ascilite.org.au/conferences/perth04/procs/pdf/augar.pdf> on Jul. 27, 2012.*

(Continued)

*Primary Examiner* — Phuong Thao Cao

(57) ABSTRACT

Apparatus and methods are presented for the automated creation, update, distribution, acquisition, and use of learning tools designed to aid users in memorizing information and learning new concepts. Apparatus comprises learning tools that contain the data to be presented to users as well as information describing how the data is to be presented, a learning tool engine that provides user interaction and learning tool operation, an optional peer-to-peer client that may be combined with a learning tool engine to acquire and distribute learning tools, a swarm that manages learning tools and descriptors and user-to-user communications, and a builder that creates and updates learning tools. Methods comprise creating new learning tools, updating learning tools as new, improved, or corrected materials become available, creating and managing unique identifiers, sharing learning tools with others, and coordinating the activities of multiple simultaneous users of learning tools.

8 Claims, 8 Drawing Sheets

U.S. PATENT DOCUMENTS

| | | | | |
|---|---|---|---|---|
| 2006/0127865 | A1* | 6/2006 | Siders et al. | 434/219 |
| 2006/0230102 | A1* | 10/2006 | Hidary | 709/203 |
| 2007/0072160 | A1* | 3/2007 | Jolly et al. | 434/262 |
| 2007/0101256 | A1* | 5/2007 | Simonyi | 715/511 |
| 2007/0111858 | A1* | 5/2007 | Dugan | 482/8 |
| 2007/0136360 | A1* | 6/2007 | Randall et al. | 707/102 |
| 2007/0196803 | A1* | 8/2007 | Goodrich | 434/323 |
| 2007/0198535 | A1* | 8/2007 | Oliver et al. | 707/10 |
| 2007/0208858 | A1* | 9/2007 | Ra et al. | 709/227 |
| 2007/0218448 | A1* | 9/2007 | Harmeyer et al. | 434/350 |
| 2008/0140947 | A1* | 6/2008 | Slik et al. | 711/154 |
| 2008/0209045 | A1* | 8/2008 | Rothstein et al. | 709/227 |
| 2008/0256015 | A1* | 10/2008 | Woolf et al. | 706/48 |
| 2008/0299953 | A1* | 12/2008 | Rao | 455/414.1 |
| 2008/0307264 | A1* | 12/2008 | de Halleux et al. | 714/38 |
| 2009/0031221 | A1* | 1/2009 | Hookham-Miller | 715/730 |
| 2009/0035733 | A1* | 2/2009 | Meitar et al. | 434/118 |
| 2009/0099983 | A1* | 4/2009 | Drane et al. | 706/12 |
| 2009/0138606 | A1* | 5/2009 | Moran et al. | 709/227 |
| 2009/0155757 | A1* | 6/2009 | Gradisar et al. | 434/350 |
| 2009/0187834 | A1* | 7/2009 | Rapo et al. | 715/758 |
| 2009/0204517 | A1* | 8/2009 | Edens et al. | 705/30 |
| 2009/0210479 | A1* | 8/2009 | Ahmed et al. | 709/203 |
| 2009/0327234 | A1* | 12/2009 | Coladonato et al. | 707/3 |
| 2010/0131406 | A1* | 5/2010 | Deck et al. | 705/38 |
| 2010/0151934 | A1* | 6/2010 | Kniberg et al. | 463/24 |
| 2010/0161653 | A1* | 6/2010 | Krasnow | 707/769 |
| 2010/0190145 | A1* | 7/2010 | Singer et al. | 434/335 |
| 2010/0217771 | A1* | 8/2010 | Nash | 707/769 |
| 2010/0221693 | A1* | 9/2010 | Gupta | 434/362 |
| 2010/0293041 | A1* | 11/2010 | Teasdale et al. | 705/14.1 |
| 2010/0304349 | A1* | 12/2010 | Kunin | 434/323 |
| 2011/0173206 | A1* | 7/2011 | Tang | 707/741 |
| 2012/0135389 | A1* | 5/2012 | Desruisseaux | 434/362 |
| 2012/0265613 | A1* | 10/2012 | Ramer et al. | 705/14.53 |
| 2012/0265770 | A1* | 10/2012 | Desjardins et al. | 707/748 |

OTHER PUBLICATIONS

Parker et al., "Wiki as a Teaching Tool", Interdisciplinary Journal of Knowledge and Learning Objects, vol. 3, 2007, 16 pages.*

Lectora Website, "Create Engaging Learning Experiences", 2 pages, accessed online at <http://lectora.com/e-learning-software> on Jul. 27, 2012.*

Joe Wood, "Learning (Math) in Multi-User Virtual Games—Session 3", Oct. 14, 2008, 6 pages, accessed online at <http://www.joewoodonline.com/learning-math-in-multi-user-virtual-games-session-3/> on Jul. 27, 2012.*

* cited by examiner

US 8,380,754 B2

APPARATUS AND METHODS FOR CREATING, UPDATING, AND USING LEARNING TOOLS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to the fields of computer-based learning tools, databases, search algorithms, and computer-assisted learning.

2. Description of the Related Art

Flashcard, fill in the blank, labeling, and multiple-choice quizzes are time-honored learning tools. With the wide availability of personal computing devices and access to wide area networks, it has now become possible to automate the creation of these and other learning tools. Since these learning tools may be implemented on computing devices with access to wide area networks, it is now possible to create learning tools that can update themselves using data retrieved from online data sources.

As an example, a flashcard learning tool may present a word, phrase, or definition in one language and prompt the user to provide the equivalent word or phrase in another language. Alternatively, the learning tool may present a picture to the user and prompt the user for the word or phrase that describes the picture.

With the development of online ontologies (Cyc, Open Mind Common Sense, WordNet and other subject-matter ontologies), dictionaries (wiktionary, thefreedictionary), encyclopedias (wikipedia, citizendium), and textbooks (textbookrevolution), it is now possible to automate not only the creation of learning tools, but also the updating of these tools as new or updated source material becomes available. The present invention extends the "wiki" model of collaborative development for web pages to allow a large, global community of users to collaborate in creating and updating high quality learning tools and materials almost instantly.

BRIEF SUMMARY OF THE INVENTION

The invention comprises apparatus and methods for the automated creation, update, distribution, acquisition, and use of learning tools. These learning tools are designed to aid users in memorizing information and learning new concepts.

The invention apparatus comprises four major components: learning tools that contain the data to be presented to users as well as information describing how the data is to be presented, a learning tool engine that provides user interaction and learning tool operation, a swarm that manages learning tools and descriptors, and a builder that creates and updates learning tools. The invention apparatus may be embodied as a traditional client-server system wherein the swarm is a server or set of servers that respond to requests from learning tool engines. In this embodiment, all requests from the learning tools are processed by a swarm. The swarm sends responses, including learning tools, to the requesting learning tool engines. In another embodiment, the swarm may be deployed as a peer-to-peer network, wherein the swarm coordinates communication between multiple learning tool engines. In this embodiment, the individual learning tool engines upload and download learning tools to and from each other using an optional peer-to-peer client component. This component may be a stand alone component, or it may be integrated into a learning tool engine.

The invention methods comprise methods for creating learning tools based on type of learning tool, data sources, level criteria, and user preferences. The methods further comprise methods for updating learning tools both manually and automatically, changing user preferences and level of difficulty both manually and automatically, using images and animation, presentation of multiple answers, and coordinating usage and communication between multiple users.

The invention also includes methods for updating learning tools as new or corrected materials become available. Further, users may create their own learning tools, share them with others, and compete against other users.

BRIEF DESCRIPTION OF THE DRAWINGS

The nature, objects, and advantages of the invention will become more apparent to those skilled in the art after considering the following detailed description in connection with the accompanying drawings illustrating example embodiments of the apparatus and methods of the present invention, in which like reference numerals designate like parts throughout, and wherein.

DETAILED DESCRIPTION OF SELECTED EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents. Reference throughout this specification to "one embodiment" or "an embodiment" means that a particular feature, structure or characteristic described in connection with the embodiment of the invention is included in at least one embodiment of the invention. Thus, appearances of the phrases "in one embodiment" or "in an embodiment" in various places throughout this specification are not necessarily all referring to the same embodiment of the invention. Furthermore, the particular features, structures or characteristics may be combined in any suitable manner in one or more embodiments of the invention.

Figure 2:
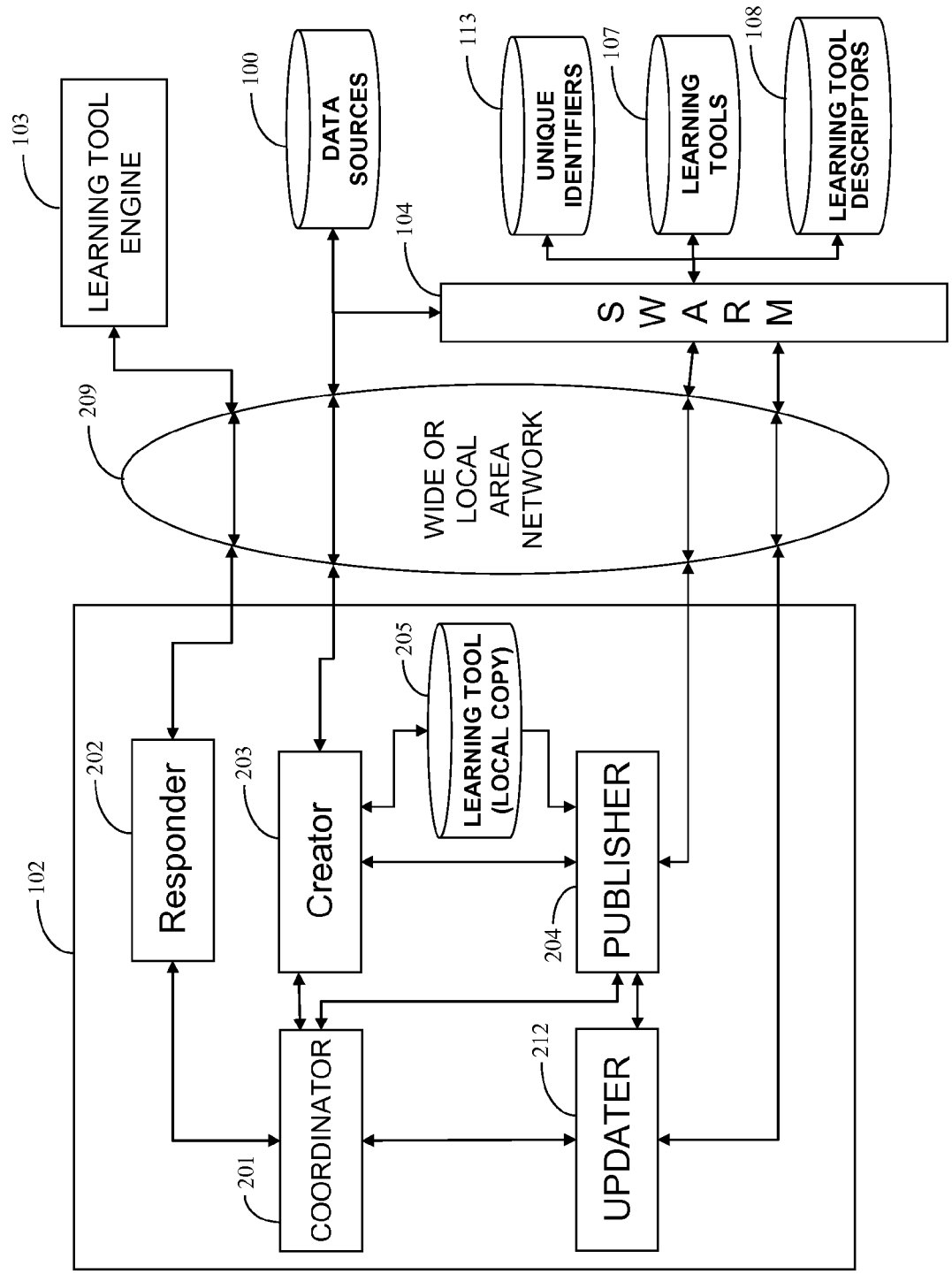
FIG. 2 is a functional diagram of an example of a builder entity in accordance with one embodiment of the invention.
Figure 3:
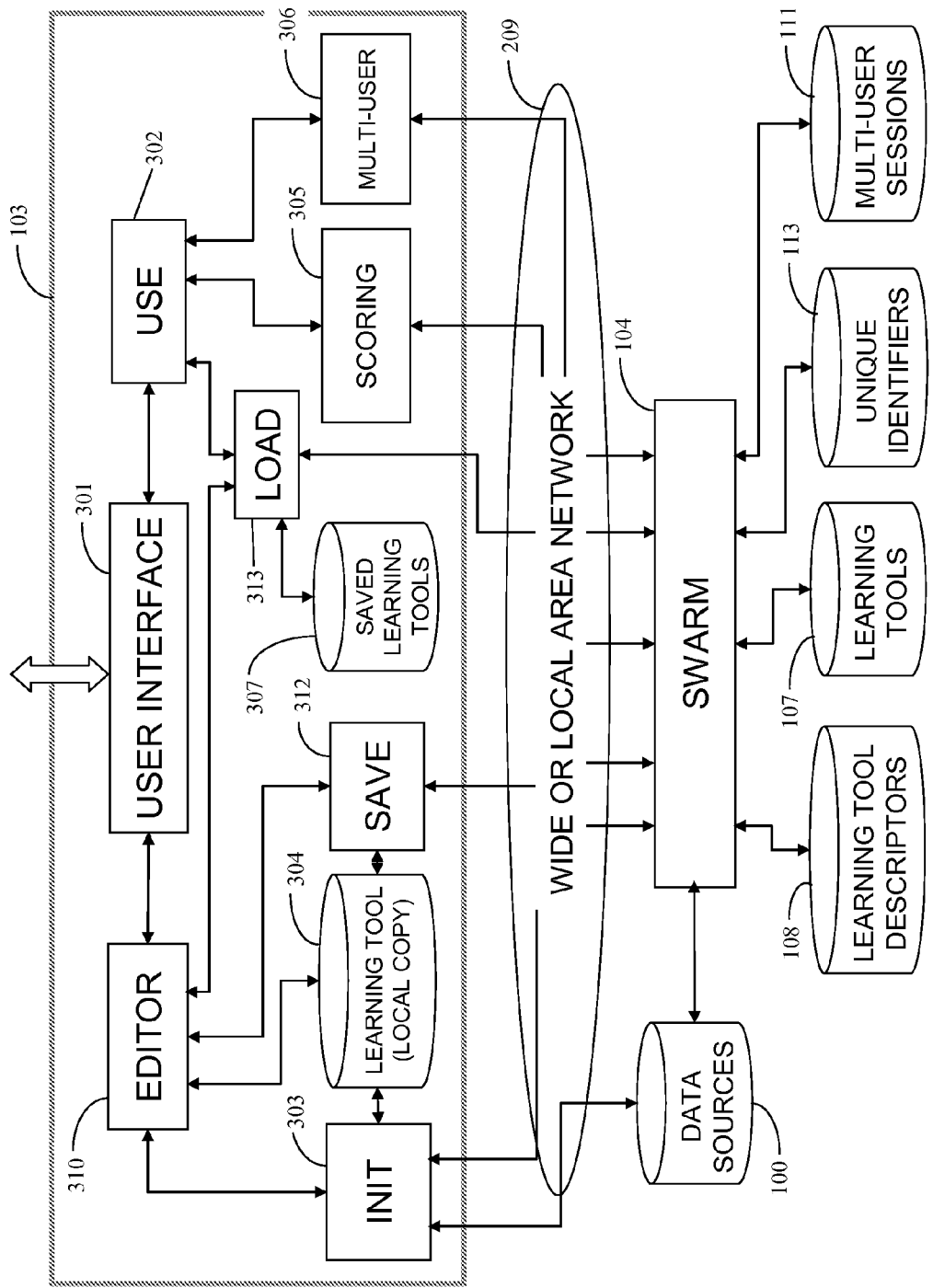
FIG. 3 is a functional diagram of an example of a learning tool engine entity in accordance with one embodiment of the invention.
Figure 4:
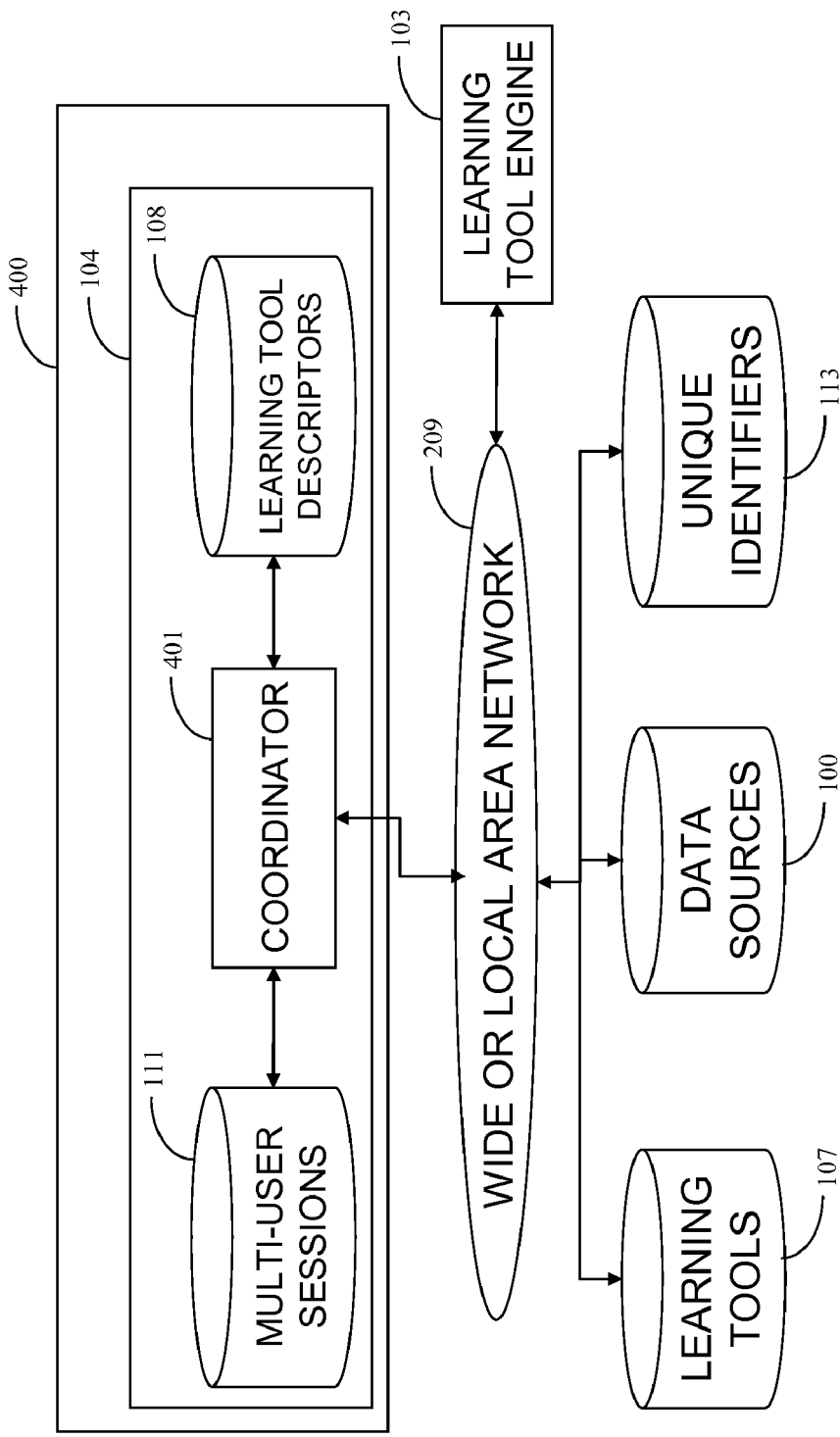
FIG. 4 is a functional diagram of an example of a swarm entity in accordance with one embodiment of the invention.

For illustrative purposes, FIGS. 2, 3, and 4 show example embodiments where the components connect over local or wide area networks (209), but since the components use standard inter-process communications methods to communicate, these components could also reside on a single computing device. Similarly, components could be combined and functions moved from one component to another for the sake of convenience, ease of use, or efficiency, all without departing from the scope of the invention. Furthermore, the methods described in the following sections could be significantly improved, again without departing from the scope of the invention.

Components and Interconnects

Figure 1:
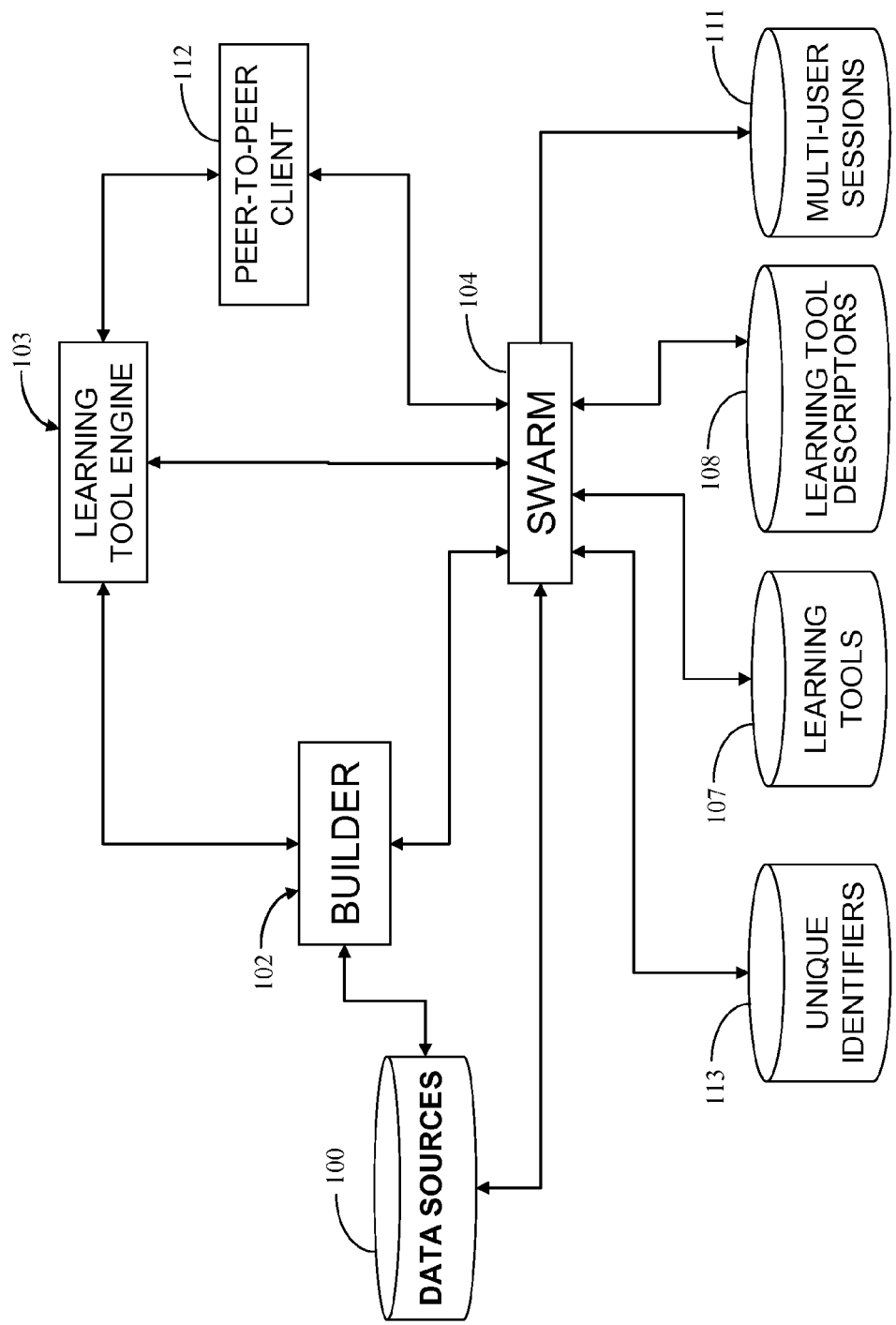
FIG. 1 is a diagram indicating the various entities involved in the activities covered by one embodiment of the invention and the interactions among them.

The invention may be scaled from a single user system, running on a single computing device, to a globally distributed system supporting a virtually unlimited number of users, running on many widely distributed computing devices, connected via a wide area network. FIG. 1 illustrates the major components and interconnects of one exemplary embodiment of the invention comprising four major functional components: a learning tool engine (103), a builder (102), a swarm (104), and an optional peer-to-peer client (112).

A swarm (104) is a system for managing learning tools (107), learning tool descriptors (108), unique identifiers (113), and multi-user sessions (111). A swarm may be implemented as a monolithic or distributed server, providing content to clients and allowing clients to communicate with each other. Alternatively, a swarm may also be implemented as a peer-to-peer system, using BitTorrent or other suitable technology. A swarm also may coordinate activities between multiple users and learning tool engines. A swarm uses standard methods of inter-process communication to communicate with learning tool engines (103) and builders (102) and to upload and download learning tools (107) and learning tool descriptors (108), so these components may all be located on a single computing device or may be located on various computing devices distributed locally or globally and connected via local or wide area networks (209), as shown in FIGS. 2, 3, and 4.

A learning tool engine (103) is a computer-based system that provides the main user interface. Each user runs at least one instance of a learning tool engine to connect to a swarm (104) using standard inter-process communication methods to select from pre-built learning tools (107) based on the corresponding learning tool descriptors (108). Alternatively, if the user wants to create a new learning tool, the learning tool engine uses standard inter-process communication methods to ask a builder (102) to create the new learning tool and its corresponding learning tool descriptor and any required unique identifiers. A learning tool engine also provides learning tool operation, timing, scoring, and supplemental materials. It decides the order in which learning tool materials are presented to the user. It may change this order based on the speed and accuracy of the user's responses. This system also allows the user to use a builder (102) to make corrections to the learning tools or data sources (100), as well as to publish user-created or updated learning tools to a swarm. In an example embodiment wherein the invention is deployed as a peer-to-peer system, a learning tool engine may include or may interface to a peer-to-peer client component (112) that handles communication with a swarm and with other learning tool engines, comprising the upload and download of learning tools, learning tool descriptors, and multi-user information. In a client-server embodiment, a learning tool engine downloads learning tools from and uploads newly created or modified learning tools to a swarm rather than to and from its peers.

A builder (102) builds or updates learning tools (107) and learning tool descriptors (108) using, and possibly modifying, data sources (100) and unique identifiers (113). A builder uses a swarm (104) to access unique identifiers, learning tools, and learning tool descriptors. A builder may directly access and use a wide array of data sources, for example, ontologies (Cyc, Open Mind Common Sense, WordNet and other subject-matter ontologies), dictionaries (wiktionary, thefreedictionary), encyclopedias (wikipedia, citizendium), or textbooks (textbookrevolution). The user may choose from pre-built data sources, data maps, and level criteria, or may pick new sources, maps, and level criteria. The data maps identify which data in the data sources is to be used for building the learning tools. The level criteria allow a builder to label a learning tool and its contents according to level of difficulty. Each learning tool has a corresponding learning tool descriptor that contains key descriptive information about the learning tool, comprising, for example, a uniform resource locator (URL) used to request the file from a swarm, names for the files, their lengths, the size of the individual pieces of each file, and a hash code. This information allows a learning tool engine to find, download, upload, and verify that it has correctly downloaded a learning tool. A builder uses unique identifiers (113) that are used to label semantic units within data sources and to link identical or similar semantic units that reside in different data sources. Unique identifiers may be embedded in the data sources, or they may exist as separate units. In either case, they provide the links from a learning tool to its data sources, allowing users of learning tools to verify the sources of information, and, if necessary, update or correct the contents of those sources.

A peer-to-peer client (112) is an optional integrated (into a learning tool engine) or stand-alone component that communicates with a swarm (104) to find learning tool descriptors (108). It uses learning tool descriptors to access learning tools (107). In a peer-to-peer embodiment, the actual learning tools need not be resident on any particular server. Rather, copies may reside on the computing devices of multiple users throughout a network. In this case, the swarm provides tracking information that allows a peer-to-peer client to find and contact peers in order to upload and download learning tools and other files. A peer-to-peer client may also use a swarm to access information about multi-user sessions that a swarm maintains in a multi-user sessions database (111).

Creating and Updating Learning Tools: Functional Components of a Builder

FIG. 2 provides a functional description of an example embodiment of a builder (102) comprising several functional components. A responder (202) component of a builder accepts and responds to requests from a learning tool engine (103) via local or wide area networks (209). A typical request might provide a set of criteria for the creation of a new learning tool. A responder acknowledges the request and passes it along to a coordinator (201) that validates requests, coordinates requests from different learning tool engines, and sends a request to a creator (203) to use a swarm (104) to identify suitable data sources (100), locate the files, and start building a local copy of a learning tool (205) from data sources (100) and unique identifiers (113). A creator may also directly access data sources, without using a swarm. If the unique identifiers do not exist, the creator must create them. A creator gives the coordinator an estimate of how long it will take to create the requested learning tool. The coordinator may provide this estimate, as well as progress updates, to the requesting learning tool engine.

When a creator (203) finishes creating a new learning tool, it sends a request to publish the local copy of the learning tool (205) to a publisher (204). If a creator is unable to create a learning tool, it reports the reason to the coordinator (203), which in turn notifies the responder (202), which notifies the requesting learning tool engine (103).

When a publisher (204) receives a request to publish a learning tool, it creates a learning tool descriptor and asks a swarm (104) to add it to a database of learning tool descriptors (108). It also ensures that the local copy of the learning tool (205) itself is available from the swarm (104). This may involve copying the local copy of the learning tool to a database of learning tools (107). Once a publisher has completed these steps, it reports the result (success or failure) to a coordinator. The coordinator in turn asks a responder (202) to notify the requesting learning tool engine (210) that the learning tool has been created and is now available.

If a coordinator receives a request to update an existing learning tool, it sends the request to an updater (212) which then contacts a swarm (104) to locate the learning tool descriptor from the database of learning tool descriptors (108). The learning tool descriptor provides all the information the updater needs in order to acquire a copy of the correct learning tool from the set of all learning tools (107) known to the swarm. The updater may still need to acquire additional information from the data sources (100) that were used to construct the learning tool or may wish to acquire information from new data sources. After updating a learning tool, the user who performed the updates may direct a builder to publish the updated learning tool as a new version, using the methods described above. The user may also direct a builder to make corresponding changes to the data sources. A builder may make changes to a data source if it has been provided with a list of instructions in a standardized format describing how it is to edit the data source. This list of instructions can be created and maintained by any interested party.

A builder need not be deployed as a single monolithic server. In a traditional client-server model, it may be deployed across multiple servers or its functions may be split across multiple servers. Alternatively, a builder and some or all of its components may be integrated into a learning tool engine or run on the same computing device as a learning tool. As another alternative, a builder may be deployed into a peer-to-peer architecture wherein a swarm coordinates builder requests and the actual work of creating learning tools and descriptors is spread across multiple computing devices that request services from each other. These computing devices may also run the learning tool engine software, so that the processes of building, updating, and using learning tools can be integrated to provide a dynamic user experience for the rapid acquisition of knowledge.

A builder may also update learning tools, either manually upon request from a user, or automatically based on a change to a data source. A manual request may identify the exact changes that have been made to the data sources. In this case, a builder simply uses the specified changes to update and create a new version of the learning tool, updating or creating unique identifiers as required. A builder then creates and publishes a corresponding learning tool descriptor. If the request does not specify the changes, the builder must scan the data sources to find any changes and then apply those changes to a new version of the learning tool. A user may also change the structure of a learning tool, for example, changing the presentation to the user, adding additional questions and learning materials, or correcting mistakes. Some changes (for example, adding additional questions) may change the data referenced by the learning tool, others may not (for example, simply rearranging or changing the artwork for a fill-in-the-blank template).

When the builder creates a new learning tool, it may create notifiers and attach them to the data sources so that it will be notified if a data source changes. A notifier is a software component that can be run whenever a file is modified. It can be used to notify a builder. If the hosts for a given data source will not allow the installation of notifiers or allow notifications, it may still be possible for a builder to periodically scan the data sources for any changes. In either case, the discovery of a change causes a builder to either automatically update the appropriate learning tool (or tools), or to notify the author (or authors) of the learning tool (or tools) that updates are available. In the former case, a builder automatically creates a new version of the appropriate learning tools, creates and publishes a corresponding new learning tool descriptor so that the new version can be discovered, downloaded, and uploaded.

Functional Components of a Learning Tool Engine

FIG. 3 is a functional diagram of an example of a learning tool engine (103) entity in accordance with one embodiment of the invention. An example learning tool engine comprises several functional components. A user interface (301) component accepts user input and handles presentation to a user who wants to use, create, or update a learning tool. In the case where the user wants to create a new learning tool, a user interface component instructs an editor (310) component to create a learning tool. The editor in turn instructs the init (303) component to create an empty learning tool template and make it available to the editor by creating a local copy of a learning tool (304).

In the cases where the user wants to edit an existing learning tool or a copy of an existing learning tool, the editor (310) asks the load component (313) to contact a swarm (104) using standard inter-process communication methods to locate the learning tool and load it into a local copy (304). The editor may need to access and possibly modify the data sources (100) and the unique identifiers (314) for the learning tool. In a client-server implementation, a load component may acquire a learning tool directly from a swarm. In a peer-to-peer implementation, the load component may use an integrated or separate peer-to-peer client (112), as shown in FIG. 1, assisted by a swarm, to acquire a learning tool from other computing devices and to distribute learning tools to other devices.

When the user has finished editing the learning tool, the editor (310) asks the save (312) component to save the learning tool and a corresponding learning tool descriptor to the swarm (104) so that it can be available to other users. In a client-server deployment, the save component may save these components directly to the swarm. In a peer-to-peer embodiment, the save component may use the integrated or separate peer-to-peer client (112), as shown in FIG. 1, to send only the corresponding learning tool descriptor to the swarm. In this case, the swarm may keep only the learning tool descriptor in the storage under its direct control (108), relying on the individual users, editors, and creators of the learning tool to maintain copies of the learning tool.

In the cases where the user wants to use an existing learning tool, the user has several choices. For example, the user can specify the learning tool by name or unique identification number, the user may search for learning tools meeting user-specified criteria, or the user may browse a catalog of learning tools. In any case, a use (302) component instructs a load (313) component as to the user's wishes, and the load component provides the appropriate information (a list of learning tools with information about each learning tool, notification that a specific learning tool has been loaded, results of a search) by requesting it from a swarm (104). Once the user has selected a specific learning tool, a user interface (301) component instructs a load (313) component to load a learning tool from a swarm (104) and make it available for use by the learning tool engine. As noted earlier, the load component may either work directly with a swarm or may use a peer-to-peer client.

In the case where a user wants to resume a previously saved learning tool, the use (302) component asks the load (313) component to find and load the appropriate learning tool and saved learning tool state information (307). The state information allows the learning game engine to remember which concepts a user has already mastered and which require further review. The user may have a choice of several saved learning tools, in which case the use component helps the user to select the correct learning tool and state information. The load component also handles requests to save the current state information for a learning tool.

Once a learning tool is loaded for use, a use (302) component works with a user interface component to allow the user to use the learning tool. The use component creates each presentation to the user, relying on a scoring (305) component to record the score after the user responds to each presentation and at the end of the learning tool. In addition to reporting scores to the user, a scoring component may also store scores into a swarm so that users can compare their scores. The use component also uses the multi-user (306) component to allow the user to participate in multi-user learning tool sessions. The multi-user component relies on a swarm (104) to facilitate and initiate multi-user sessions. The swarm may maintain a database of multi-user sessions in a multi-user sessions database (111). The swarm may also act as a proxy to facilitate and handle anonymous communication with other learning tool engines. Alternatively, it may connect to multi-user components in other learning tool engines, either directly or via an alternative proxy server.

Functional Components of a Swarm

FIG. 4 is a functional diagram of an example embodiment of a swarm (104). In this example, a coordinator (401), a database of learning tool descriptors (107), and a database of multi-user sessions (111) reside on a server (400). This server may be deployed as an array of redundant servers that may be co-located or may be geographically dispersed. The databases need not be resident on the same server; they can also be deployed on separate servers, accessed via a wide or local area network (209). A coordinator functions as a request server, responding to requests for learning tool descriptors from a learning tool engine (103) via a wide or local area network (209). Usually, a user will use a learning tool engine, described in the previous section, to make requests of a swarm, but a user may also use other, specialized software, as long as it follows the same protocol as a learning tool engine. Users may request various services from a swarm, including requests for learning tool descriptors and learning tools, to create new learning tool descriptors, to coordinate multi-user learning tools, and to save and retrieve scores, learning tools, learning tool descriptors, and unique identifiers.

A swarm (104) maintains a database of learning tool descriptors (108). As described earlier, each descriptor provides information that may be used to locate and download of a copy of its corresponding learning tool from local systems or from systems connected to a wide or local area network (209). If a load component downloads or uploads a learning tool in pieces, it provides the swarm with progress and availability reports. In a peer-to-peer system, the load component may rely on a peer-to-peer client component (112) as shown in FIG. 1 to perform these functions. In case a user wants to check or correct the sources of information for a learning tool, each learning tool provides information about the data sources (100) and unique identifiers (113) that were used to build the learning tool.

In a similar fashion, a swarm (104) may facilitate and coordinate the operation of multi-user learning tools, using a database of available and ongoing multi-user sessions (111). A user may use the services of a swarm to search for ongoing multi-user learning tools, advertise his or her desire for specific multi-user learning tools, and to join and participate in the use of multi-user learning tools. The entries in the multi-user sessions database provide information on learning tools, users using the tools or interested in using the tools, and scores.

In a client-server embodiment, a swarm manages the actual learning tools, distributing them to users on request and accepting new or modified learning tools from users. In a peer-to-peer embodiment, the learning tool engines use peer-to-peer clients (112), as shown in FIG. 1, to upload and download learning tools to and from each other. In this case the server facilitates uploads and downloads by providing tracking information and services so that peer-to-peer clients can find and communicate with each other.

Example Data Structures for a Learning Tool

Figure 5:
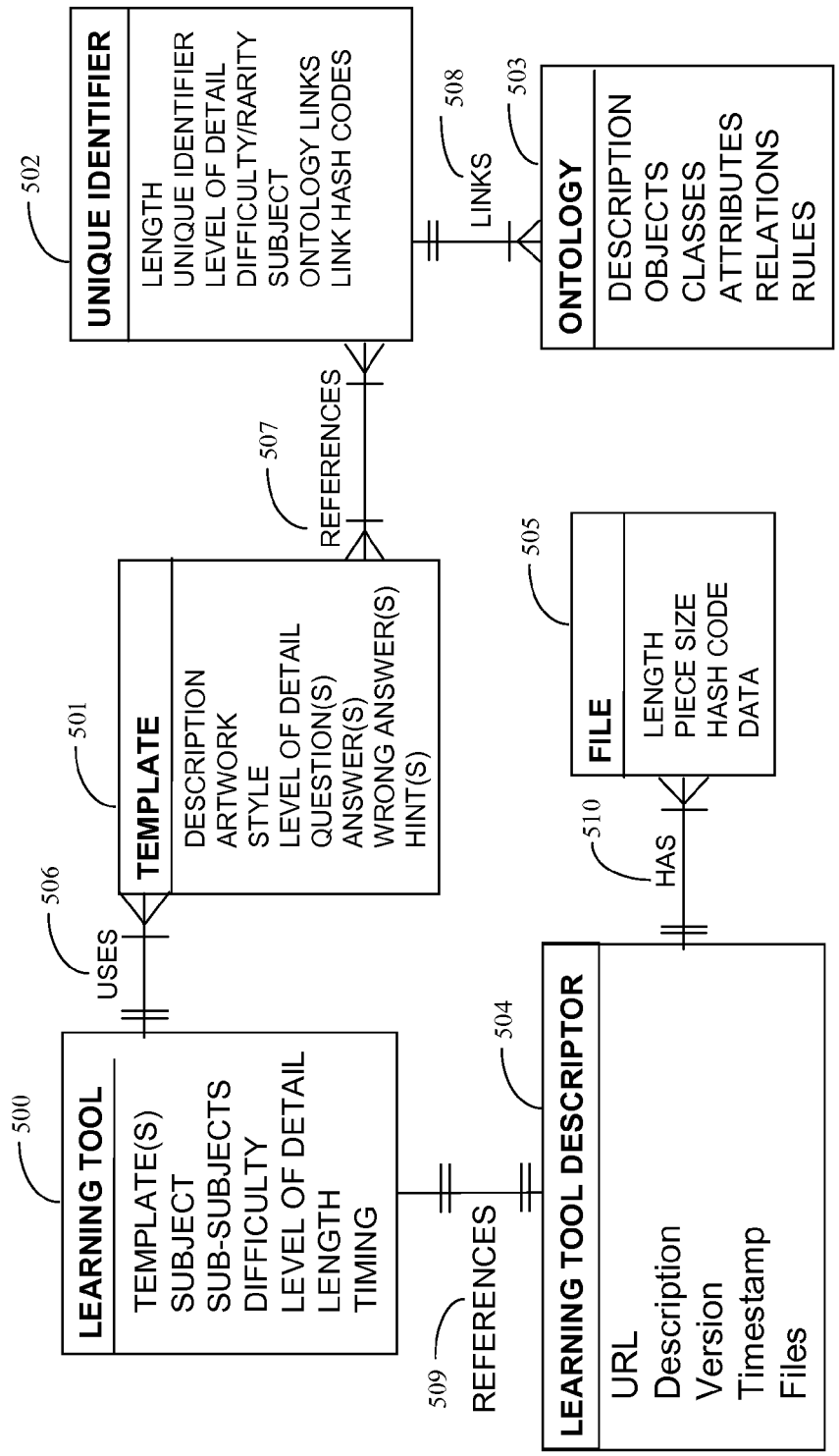
FIG. 5 provides an example of the basic data structures and data descriptions for an exemplary embodiment of a learning tool.

FIG. 5 provides an example of the basic data structures and data descriptions for an exemplary embodiment of a learning tool. In this example, a learning tool descriptor (504) allows a user to locate a learning tool object or table (500). The learning tool descriptor contains a URL (uniform resource locator) that references (509) a specific learning tool (500). A learning tool descriptor has a one to many relationship (510) to a set of files (505). Each file, in addition to its data, includes information on how it is to be uploaded or downloaded: the total length in bytes of the data, size of each piece of data for upload/download purposes, and a hash code for each piece. Although each learning tool descriptor refers to one and only one learning tool, there can be many copies of a learning tool descriptor and its associated files distributed across many computing devices connected by local or wide area networks.

A learning tool (500) may use multiple (506) templates (501) to organize its data for presentation to users. A learning tool contains information about its subject area and possibly subcategories within that subject. A learning tool may be organized to follow an ontology, so there may be many levels of subcategories. A learning tool might also provide additional information, comprising difficulty ratings, level of detail, number of questions, and usage parameters such as timing.

A template (501) provides the basic information on how the learning tool is presented to the user. Description, artwork, and style parameters determine how the learning tool appears. A learning tool engine may use these parameters to decide whether a learning tool is a flashcard, multiple choice, fill-in-the-blanks, or other learning tool. A learning tool engine may create questions, answers, wrong answers for multiple choice learning tools, and hints by referencing, in a many to many relationship (507), unique identifiers (502).

A unique identifier table or object (502) links information from ontologies and other data sources (503) in a one-to-many relationship (508). Each entity within the unique identifier object or table contains a unique identifier that is essentially a serial number for a semantic unit. A semantic unit comprises a word or phrase, usage information, and meaning or sense. In this example, a unique identifier is formatted to allow unlimited expansion: the first byte indicates the number of bytes in the identifier, followed by the actual bytes of the identifier. Unique identifiers may be embedded in ontologies or other data sources, or may exist as separate entities. Each unique identifier may link (508) to multiple ontologies or other data sources (503). A hash code is computed for each link so that changes in the underlying data can be easily detected. A data source may also include information about how its own information is organized, or this may be provided in a separate entity, or the unique identifiers may link directly to data in a standard format. Unique identifier tables and databases may be partitioned by subject area, level of detail, level of difficulty, ontology, or other criteria, so that a learning tool need only reference relevant unique identifiers.

Learning Tool Creation

Figure 6:
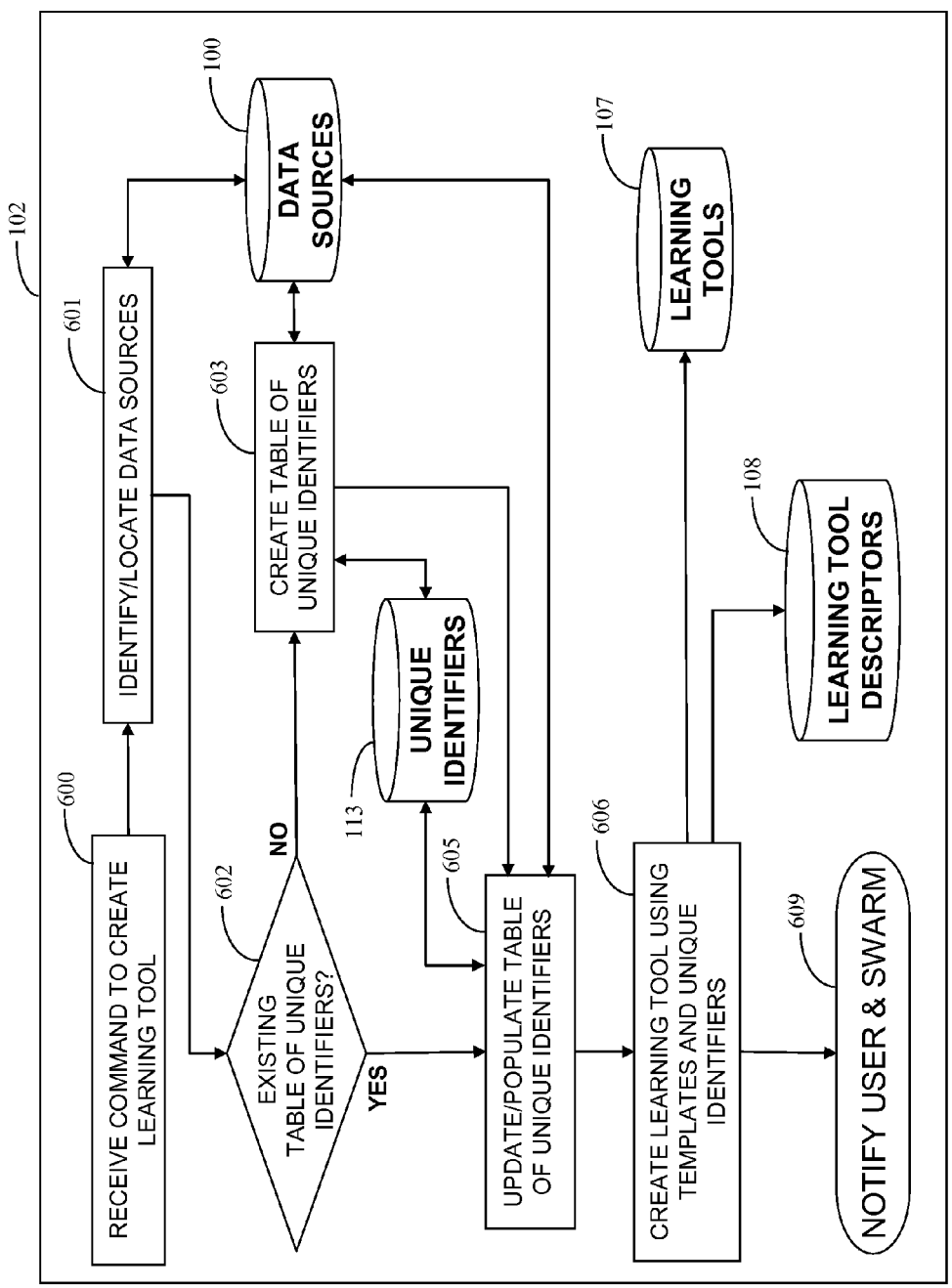
FIG. 6 is a flowchart of the learning tool creation process performed by an example of a builder in accordance with one embodiment of the invention.

FIG. 6 is a flowchart of the learning tool creation process performed by an example of a builder in accordance with one embodiment of the invention. The process starts when a builder (102) receives a command to create a learning tool (600). The builder then identifies and locates (601) the data sources (100) that will be used to build the learning tool. If the data sources include a table of unique identifiers (113) or if an appropriate table already exists (602), the builder simply populates or updates the table of unique identifiers (605), as appropriate. Otherwise, the builder creates a table of unique identifiers (603).

The structure of each individual unique identifier is described in the previous section. If an appropriate unique identifier table or database already exists, the builder searches existing unique identifier references to ensure that a data element does not already have a unique identifier, then picks and reserves the next available unique identifier, then proceeds to create a unique identifier of the form described in the previous section. Finally, the builder updates a database of unique identifiers (113) to include the newly created unique identifier. The database may consist of a global set of unique identifiers or may consist of subset of identifiers, partitioned by subject area, level of detail or difficulty, ontology or other criteria.

Next, the builder uses templates, unique identifiers, and any additional information to create a learning tool and a corresponding learning tool descriptor (606). If the user wishes to make the tool available to others, the builder adds the learning tool to the learning tools database (107) and its corresponding learning tool descriptor to the learning tool descriptors database (108). Once the learning tool is created, the builder notifies the requestor that the learning tool has been successfully created, or if the effort failed, tells the requestor what went wrong (609). The requestor then decides whether or not the builder should publish the learning tool by making it available to a swarm.

Flash Card Learning Tool Operation

Figure 7:
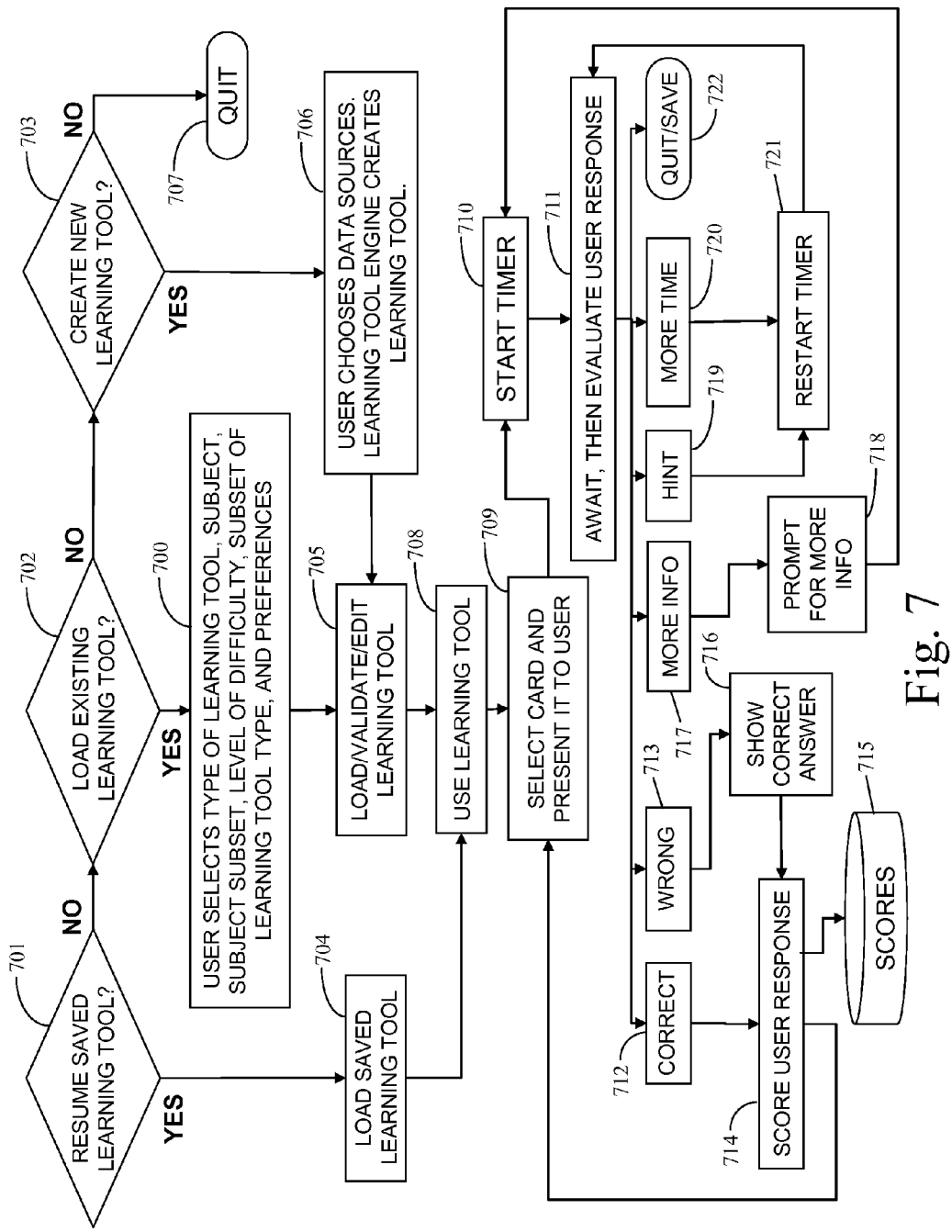
FIG. 7 is a flowchart of an example of learning tool operation using visual flashcards in accordance with one embodiment of the invention.

FIG. 7 is a flowchart of an example of learning tool operation using visual flashcards in accordance with one embodiment of the invention. The user interface (301), as shown in FIG. 3) of a learning tool engine (103) allows a user to select a learning tool to use, resume, create, update, or validate. If the user does not want to engage in any of these activities, they may exit the learning tool engine and quit (707). In cases where the user decides to create a new learning tool or update an existing learning tool (703), the process of creating or updating a learning tool (706) proceeds as described in the previous section and FIG. 6. Once the learning tool is created and published, the user may opt to load (705) and use (708) the newly created learning tool.

In cases where the user wants to load a previously saved learning tool (701), a learning tool engine locates and loads the saved learning tool (704). The user may have saved the learning tool to local storage or to storage somewhere on a wide area network. Saving a learning tool allows the user to stop using a learning tool and save the learning tool state information so that the user can later reload the learning tool and continue using from where he or she stopped. In cases where the user has saved multiple learning tools, the learning tool engine presents the user with a list of saved learning tools from which to choose. The user may also specify locations and criteria to use in searching for saved learning tools. Once the learning tool and state information have been successfully loaded, the user may proceed to use the learning tool (708).

In cases where the user wants to load, validate, or edit an existing learning tool (702), the learning tool engine provides a user interface that allows the user to find the correct learning tool (700). As an example, the user might elect to use a beginning Spanish vocabulary flashcard learning tool, using pictures. The user may also use other criteria to search for a learning tool, comprising name of the learning tool, author, version, or keywords. If the learning tool engine finds multiple learning tools matching the user's criteria, it presents the user with a list of learning tools from which to choose. The user may also select preferences for parameters that affect learning tool operation and usage, such as font size, timing, immediate evaluation, and platform, or the user may choose to use default or stored values for these preferences. The user then selects from among the learning tools found by the learning tool engine and uses the user interface to specify whether to load the selected learning tool (705) for edit, validation, or immediate use. In the last case, the learning tool proceeds to allow the user to use the learning tool (708).

The edit process is analogous to the creation process described in the previous section. The validation process consists of checking the learning tool against the data sources that were used to create the learning tool (particularly useful if the data sources have been updated) or against new data sources. The learning tool engine may use the hash codes for each unique identifier used by the selected learning tool to check for any changes to the data sources or it may ask a builder to perform this check and either automatically make any required updates or simply produce a report of the required updates so that a user can decide whether or not to make any changes. Once a new version of the learning tool is available, the user may then decide to select and use that learning tool (708).

In the simplified example of FIG. 7, the learning tool engine uses a set of criteria to randomly select a virtual card for presentation to the user (709) and starts a timer (710). In this example, the card may consist of a picture that the user must identify, using beginner-level Spanish. Depending on the learning tool parameters, the user may use a variety of methods, either singly or in combination, to provide the answer. For example, the user may select from a list of possible answers, speak the answer for analysis by voice recognition software, or type the answer. The learning tool parameters determine the length of the timer. Once the user provides a response, the learning tool engine waits for a response, then analyzes and evaluates the response (711). In case of a correct response (712), the learning tool engine scores the user response (714) and stores the result in a local database of scores (715). If the scores are to be visible to other users, the scores may be published to a swarm. In the case wherein the user provides the wrong answer (713), the learning tool engine presents the correct answer to the user visually and audibly (716), the scores the user response, and stores the result in a database of scores.

If the learning tool includes hints, the user may ask for a hint (719). In this case, the learning tool engine presents the appropriate hint, restarts the timer (721), and the waits for a response from the user (711). The learning tool data specifies how many hints are available and how often and how many times a user can ask for hints.

The user may also ask for more time (720). If this option is available for the learning tool data that the user has selected, the learning tool engine restarts the timer (721) and waits for a response from the user (721). The user may also quit (722), either with or without saving the state of the current session. Similarly, the user may also pause the current session for resumption at a later time.

A learning tool may contain additional information (717) that may be requested from the user (718). For example, a language learning flashcard tool may prompt a user to supply synonyms, declensions, or translation to other languages. As another example, a human skeletal anatomy learning tool may request additional details once a user supplies the correct name of a particular bone: processes of a particular bone, differences in child and adult structure, ligaments, or tendons.

Multi-User Flash Card Learning Tool Operation

Figure 8:
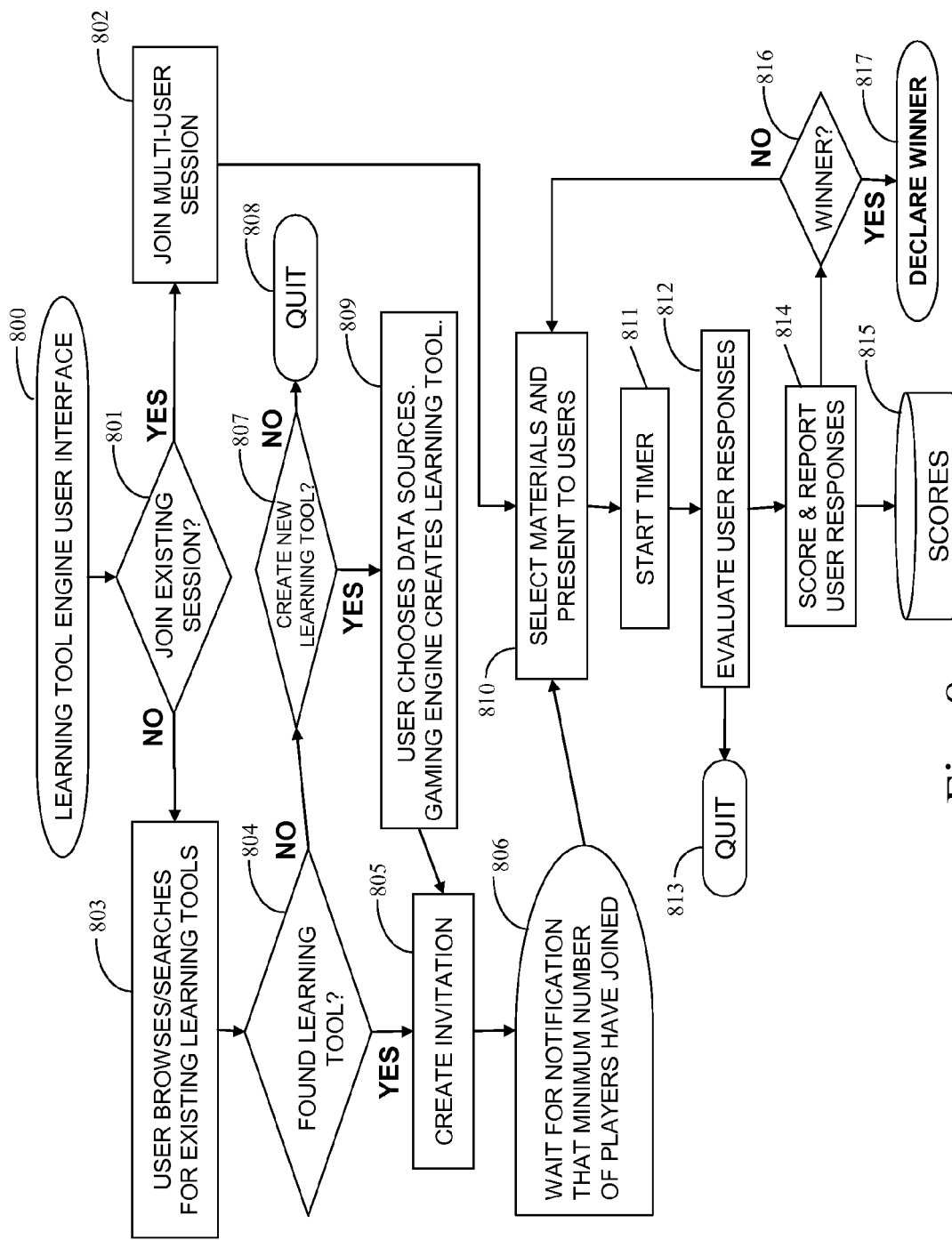
FIG. 8 is a flowchart for an exemplary embodiment of a multi-user flashcard learning tool in accordance with one embodiment of the invention.

FIG. 8 is a flowchart for an exemplary embodiment of a multi-user flashcard learning tool in accordance with one embodiment of the invention. The process is initiated when a user indicates to a learning tool engine user interface (301) that he or she wishes to participate in a multi-user learning tool session. The learning tool connects to a swarm or to multiple swarms, and then allows the user to browse or search for multi-user sessions (801) and, if a suitable session is found, join it (802).

Alternatively, a user may elect to create a new multi-user session (803) using an existing learning tool (804). Alternatively, a user may decide to create a new learning tool (807) as described earlier in the section titled "Learning Tool Creation" (809). In either case, the user may then proceed to create an invitation (805) to advertise that a multi-user session is available for the selected learning tool. Of course, a user may also decide to quit (808).

The learning tool engine then waits until it receives notification that the specified minimum number of users have joined the advertised multi-user session (806). A swarm (described earlier) works with the multi-user component of the learning tool engines (306), as shown in FIG. 3, coordinating the use of the learning tool by multiple simultaneous users and for selecting the materials to be presented to the users and the manner in which these materials are to be presented (810). For example, the same question may be presented simultaneously to multiple users; the first to answer correctly wins the round. Alternatively, questions may be presented to one user at a time. A single learning tool may use a variety of methods to present information to the users, to start a timer (811), to wait for and to evaluate the responses (812), to score and report the responses (814), and to record the results of each round to a database of scores (815) managed by a swarm. After each round, the swarm totals the results, then checks to see if any of the participating users have received a score high enough (816) to allow the swarm to declare a winner (817).

The flowchart has been simplified to show two important times when a user may quit (808, 813); in reality, a user can quit at any time.

Other Embodiments

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the appended claims and their equivalents. Finally, it will be appreciated by those skilled in the art that changes could be made to the embodiments described above without departing from the broad principles of the invention. It is understood, therefore, that this invention is not limited to the particular embodiments disclosed, but is intended to cover modifications within the spirit and scope of the present invention as defined in the appended claims.

What is claimed is:

1. An apparatus that is a system for automated creation, update, distribution, acquisition, and use of learning tools, comprising
one or more tables or databases of unique identifier containers for data elements or linked sets of data elements, each said unique identifier container comprising a unique identifier, a reference to a data element or references to a linked set of data elements, a hash code for each reference, and classification information,
one or more learning tools that each comprise presentation and data structures, data, references, and unique identifier containers, said learning tool or tools residing in a computer-readable memory,
learning tool descriptors for each learning tool wherein each said learning tool descriptor comprises a description of the learning tool, information and instructions on locating and downloading the learning tool and any associated files, verification information, and version information,
one or more learning tool engines comprising a computing device, user interface components, computer-readable memory, and computer instructions, said one or more learning tool engines providing user interaction as well as learning tool operation and update, comprising acquisition, use in both single user and multi-user sessions, creation, editing, and automated updating based on references to data elements, one or more builders comprising a computing device or set of computing devices that create and update learning tools, either manually, in response to user input, or automatically, one or more swarms, each comprising a server computer or set of server computers that respond to requests from learning tool engines, said swarm or swarms managing learning tool descriptors, facilitating communication between users of learning tools, and distributing learning tools and updates to said learning tools, one or more databases of learning tool descriptors, said learning tool descriptors stored on computer-readable media, accessed by a computer server or servers in response to requests from learning tool engines, builders, and swarms.

2. The apparatus of claim 1, wherein the apparatus includes one or more peer-to-peer clients, comprising a computing device, user interface components, computer-readable memory, and computer instructions, where each of the one or more peer-to-peer clients operates as a stand alone component to acquire and distribute learning tools in response to requests either directly from users or from one or more learning tool engines.

3. The apparatus of claim 1, wherein the apparatus includes one or more peer-to-peer clients, comprising a computing device, user interface components, computer-readable memory, and computer instructions, where each of the one or more peer-to-peer clients is combined with a learning tool engine to enable said learning tool engine to acquire and distribute learning tools.

4. A method for creating unique identifier containers for individual data elements and linked sets of data elements from contents of said data elements wherein said unique identifier containers comprise references to said data elements, comprising the steps of accessing, by at least one computing device, an existing table or database of unique identifier containers or creating a new table or database of unique identifier containers, searching, by the at least one computing device, existing unique identifier container references to ensure that a data element or linked set of data elements does not already have a unique identifier container, if the data element or linked set of data elements does not have a unique identifier container, creating, by the at least one computing device, a unique identifier container for said data element or linked set of data elements, creating, by the at least one computing device, a reference for each data element, computing, by the at least one computing device, hash codes for the data elements, such that said hash codes provide a mechanism for determining whether or not the data elements referenced by the unique identifier container have changed, creating, by the at least one computing device, a unique identifier container comprising length in bytes of said unique identifier container, a unique identifier for said unique identifier container, classification information, pairs of references to data elements and hash codes for said data elements, recording, by the at least one computing device, the unique identifier container into a global set of unique identifier containers or into a subset of unique identifier containers.

5. A method of creating automatically updateable learning tools comprising the steps of identifying, locating, and selecting, by at least one computing device, data sources, selecting, by the at least one computing device, data elements or linked sets of data elements within the selected data sources, if a table or database of unique identifier containers exists, searching, by the at least one computing device, said table or database for unique identifier containers corresponding to the selected data elements or linked sets of data elements, if a table or database of unique identifier containers does not exist, creating, by the at least one computing device, a table or database of unique identifier containers, if unique identifier containers for the selected data elements or for the linked set of data elements do not exist, creating, by the at least one computing device, unique identifier containers, each said unique identifier container comprising a unique identifier, a reference to a data element or references to a linked set of data elements, a hash code for each reference, and classification information, for the selected data elements or linked set of data elements within the selected data sources, creating, by the at least one computing device, a user interface and operation template for a learning tool, using unique identifier containers, by the at least one computing device, to link each templated location to one or more data elements, creating, by the at least one computing device, a learning tool descriptor that defines the learning tool and how it is to be found, downloaded, and uploaded, creating, by the at least one computing device, entries in databases or tables of learning tools and learning tool descriptors, wherein said entries identify and link learning tools to learning tool descriptors and user interface and operation templates.

6. A method for automatic and manual updates of learning tools, components, and descriptors, comprising the steps of identifying, by at least one computing device, a learning tool to be updated, where said learning tool comprises one or more references to learning tool descriptors, said learning tool descriptors comprising a description of the learning tool, information and instructions on locating and downloading the learning tool and any associated files, verification information, and version information, and said learning tool also comprises a template that connects user interface elements to data elements within specified data sources using unique identifier containers for data elements or linked sets of data elements, each said unique identifier container comprising a unique identifier, a reference to a data element or references to a linked set of data elements, a hash code for each said reference, and classification information, identifying, by the at least one computing device, data elements of the learning tool and data sources for said data elements, setting up notifiers, by the at least one computing device, such that any changes to the data elements that are referenced by the learning tool will trigger either an automatic update of the learning tool or a notification to one or more users that updates are available, scanning, by the at least one computing device, the data elements, using version information and hash codes to identify changes, and propagating those changes to the learning tool, changing, by the at least one computing device, the learning tool with or without changing references to the data elements, saving, by the at least one computing device, a new version of the learning tool, creating and saving, by the at least one computing device, a new learning tool descriptor that corresponds to the new version of the learning tool, said new learning tool descriptor comprising a description of the new version of the learning tool, information and instructions on locating and downloading the new version of the learning tool and any associated files, verification information, and version information.

7. A method of operating on an automatically updateable learning tool to provide a user with a computer-assisted learning experience, comprising the steps of keeping learning tool session information, by at least one computing device, when a user uses a learning tool so that said learning tool session information can be saved and used to resume an earlier learning tool session, accepting, by the at least one computing device, user input as to whether to resume a previously saved learning tool session, to load, validate, or edit an existing learning tool, or to create a new learning tool wherein each learning tool comprises one or more references to learning tool descriptors, said learning tool descriptors comprising a description of the learning tool, information and instructions on locating and downloading the learning tool and any associated files, verification information, and version information, and said learning tool also comprises a template that connects user interface elements to data elements within specified data sources using unique identifier containers for data elements or linked sets of data elements, each said unique identifier container comprising a unique identifier, a reference to a data element or references to a linked set of data elements, a hash code for each said reference, and classification information, in cases where the user elects to resume a previously saved learning tool session, allowing, by the at least one computing device, the user to resume the saved session, in cases where the user elects to browse or search for an existing learning tool, using, by the at least one computing device, learning tool descriptors to locate and access learning tools that meet the user's searching or browsing criteria, in cases where the user elects to create a new learning tool, creating, by the at least one computing device, the new learning tool, loading, by the at least one computing device, a user-selected learning tool into a computer memory, presenting, by the at least one computing device, learning tool information to the user, waiting, by the at least one computing device, for a response from the user, evaluating and scoring, by the at least one computing device, a user response, adjusting, if necessary, by the at least one computing device, presentation or operation based on user responses, updating, by the at least one computing device, contents of the learning tool based on any changes to data elements referenced by said learning tool, either automatically or in response to a request from the user, repeating, by the at least one computing device, presentation of learning tool materials until the user masters the learning tool materials, pauses, or quits.

8. A method of coordinating simultaneous use of an automatically updateable learning tool by multiple users, comprising the steps of managing, by at least one computing device, a database of ongoing multi-user sessions, allowing, by the at least one computing device, a user to use subject, data source, and version information to find and join an existing multi-user session, allowing, by the at least one computing device, the user to create a new multi-user session using either an existing learning tool or a newly created or updated learning tool, each learning tool comprising one or more references to learning tool descriptors, said learning tool descriptors comprising a description of the learning tool, information and instructions on locating and downloading the learning tool and any associated files, verification information, and version information, and said learning tool also comprises a template that connects user interface elements to data elements within specified data sources using unique identifier containers for data elements or linked sets of data elements, each said unique identifier container comprising a unique identifier, a reference to a data element or references to a linked set of data elements, a hash code for each reference, and classification information, allowing, by the at least one computing device, the user to create an invitation to a multi-user session, notifying, by the at least one computing device, the user when a minimum number of users have joined the multi-user session, starting, by the at least one computing device, the multi-user session and adding, by the at least one computing device, its information to a list or database of multi-user sessions, presenting, by the at least one computing device, learning tool materials to users in accordance with a learning tool template, starting, by the at least one computing device, a timer for responses, evaluating and scoring, by the at least one computing device, responses, determining, by the at least one computing device, if there is a winner, updating, by the at least one computing device, contents of the learning tool based on any changes to the data elements referenced by said learning tool, either automatically or in response to a request from the user, if there is no winner, continue presenting, by the at least one computing device, materials to users until there is a winner or all users quit.

* * * * *